Figure 1:
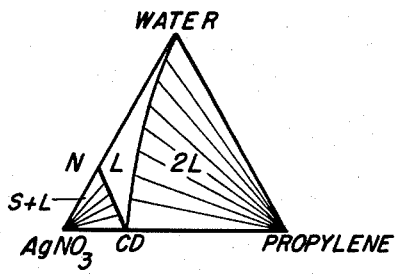

March 23, 1954     A. W. FRANCIS     2,673,225

HYDROCARBON SEPARATION

Filed Aug. 29, 1951

*INVENTOR.*
ALFRED W. FRANCIS
BY
*Robert D. Flynn*
AGENT

Patented Mar. 23, 1954

2,673,225

UNITED STATES PATENT OFFICE 2,673,225

HYDROCARBON SEPARATION

Alfred W. Francis, Woodbury, N. J., assignor to Socony-Vacuum Oil Company, Incorporated, a corporation of New York Application August 29, 1951, Serial No. 244,239

12 Claims. (Cl. 260—677)

This invention has to do with a process for separating olefins from hydrocarbon mixtures containing the same. More specifically, the invention is directed to separating olefins from hydrocarbon mixtures by virtue of the selective or preferential complex formation of olefins with silver nitrate.

This application is a continuation-in-part of application Serial No. 230,179, filed June 6, 1951.

It is well known in the art that olefins can be concentrated by absorption in silver nitrate. Several years ago, H. S. Davis and I described such a process in U. S. Letters Patent 2,077,041. We had discovered that concentrated olefin fractions could be purified by contacting them with a saturated aqueous solution of silver nitrate at relatively low temperature and under pressure sufficient to keep the olefin-containing reagent in a highly condensed or liquid state at that temperature. The olefins are then extracted from the silver nitrate solution by a liquid agent, such as hexane which is a solvent for olefins. The latter solvent is then removed, as by distillation, whereupon an enriched olefin fraction is obtained. While this process is efficacious and represented a considerable advance over prior, related processes, it does have some limitations. One disadvantage is that the saturated aqueous solutions of silver nitrate have a limited capacity for olefins. Another disadvantage is the necessity of employment of a second solvent without which desorption of the olefin from the saturated aqueous silver nitrate solution is relatively incomplete.

Following development of the aforementioned process, I discovered that solid silver nitrate, in contrast to solutions thereof, can be used to purify certain olefins. This is described in U. S. Letters Patent 2,498,204. The behavior of solid silver nitrate is particularly advantageous in view of its extreme selectivity with propylene and 1-butene. Liquid complexes are formed when solid silver nitrate is in contact with a fluid mixture containing at least 75 mol per cent of propylene or at least about 40 mol per cent of 1-butene. Here too, however, some limitations characterize this process. One limitation is in the need for high olefin concentration of the mixtures to be treated. For example, a mixture containing considerably less than 75 mol per cent of propylene must be concentrated by some other procedure in order to provide a proper charge stock for treatment with solid silver nitrate. In addition, the very selective character of solid silver nitrate is at the same time an advantage and a disadvantage. The latter is made evident by the fact that solid silver nitrate does not react or associate with ethylene, 2-butene, isobutene and the higher olefins.

I have now discovered that the foregoing shortcomings of the processes described above are obviated by contacting a suitable olefin-containing mixture with silver nitrate and a small amount of a solvent, the latter being used in an amount substantially less than that necessary to dissolve all of the silver nitrate. Described in another manner, the silver nitrate used is in an amount equivalent to a substantially supersaturated silver nitrate solution.

The advantages of this process are several fold. Surprisingly, the behavior of supersaturated solutions is less selective than that of solid silver nitrate; all olefins react or associate with silver nitrate in this process. Another advantage over solid silver nitrate is that the new process is operable with lower concentrations of olefins in the charge stocks. On the other hand, a much increased capacity for olefins represents an advantage over the saturated solutions described in the aforementioned 2,077,041 and in the prior art. Still another advantage is in the more complete desorption of the olefin associated with silver nitrate as compared with the prior art which depended upon heating or evacuation of the solution.

The process contemplated herein can be carried out in batch or continuous operation, as is the case of the predecessor processes of 2,077,041 and 2,498,204. Data reported herein to describe and illustrate the new process were obtained by a batch type operation.

The apparatus consists preferably of a vertical stirring autoclave made of stainless steel or other material non-reactive with silver nitrate. The autoclave is charged with crystals of silver nitrate and a small amount of solvent and then with the olefin-containing material. The resulting mixture is stirred until all of the silver nitrate crystals have dissolved. The agitation is stopped, and the upper liquid layer of undissolved material is then discharged through a pipe extending down from the top to a point just above the interface. A means for adjusting this position, including a sight glass is provided. The discharge will still contain some olefin, which can be concentrated by recycling the same or by a countercurrent operation.

The dissolved olefin—associated with silver nitrate in the form of a liquid complex—is then exhausted, using stirring, preferably by another outlet from the top of the autoclave. The autoclave discharge is protected from spattering of the liquid complex, as it loses its gas. The first portion of this gas is used to purge the impurities from the vapor phase and the small portion of upper layer not removable as liquid. The remaining gas is substantially pure olefin. The residue consists of finely divided crystals of silver nitrate (together with a limited amount of saturated silver nitrate solution), which are available for extraction of more olefin.

Alternatively, the above-mentioned purging can be avoided by withdrawing the solution of silver nitrate and olefin to another vessel, making a sharp separation between the dissolved olefin and the undissolved hydrocarbon by means of a valve and sight glass. Pure olefin is exhausted from the second vessel and dilute olefin in other hydrocarbons from the first one. In a subsequent operation the two vessels are interchanged in their functions, the olefin extraction being made in the second vessel, and the first vessel after exacuation, being used for desorption of the olefin.

The new process is illustrated in the following table by several examples for ethylene, propylene and 2-butene.

TABLE

*Solubilities of olefins in silver nitrate*

| Olefin | Concn.[a] | Percent AgNO$_3$ [b] | Temp., °C. | Capacity [c] |
|---|---|---|---|---|
| Ethylene | 100 | 100 | 0–10 | [f] 0 |
| Do | 100 | [d] 55 | 6 | 11.9 |
| Do | 100 | 62 | 6 | 14.6 |
| Do | 100 | 75 | 6 | 16.4 |
| Propylene | 100 | 100 | 0 | 26.7 |
| Do | 100 | 100 | 25 | 25.1 |
| Do | 100 | [d] 71 | 25 | 18.7 |
| Do | 90 | 83.3 | 0 | 25.7 |
| Do | 90 | 83.3 | 25 | 23.2 |
| Do | 65 | 83.3 | 0 | 22.0 |
| Do | 65 | 83.3 | 25 | 18.8 |
| Do | 52 | 83.3 | 25 | 14.5 |
| Do | 43 | 83.3 | 25 | 10.0 |
| Do | 90 | 84.7 | 0 | 26.8 |
| Do | 90 | 84.7 | 25 | 24.2 |
| Do | 43 | 84.7 | 25 | 10.5 |
| Do | 24 | 84.7 | 0 | 20.2 |
| Do | 55 | [e] 83.3 | 25 | 11.1 |
| Do | 38.5 | [e] 83.3 | 0 | 10.9 |
| Do | 15.5 | [e] 83.3 | 0 | 6.35 |
| 2-Butene | 100 | 100 | 0, 25 | [f] 0 |
| Do | 100 | 84.7 | 0 | 25.8 |
| Do | 100 | 84.7 | 25 | 20.7 |
| Do | 100 | [d] 71 | 25 | 4 |

[a] Percent olefin in undissolved hydrocarbon mixture at equilibrium.
[b] Part by weight AgNO$_3$ per 100 parts AgNO$_3$+solvent (water).
[c] Part by weight olefin per 100 parts AgNO$_3$+solvent (water).
[d] In these experiments the silver nitrate was completely dissolved in the absence of olefin.
[e] Other 16.7% was acetonitrile.
[f] No reaction.

From the foregoing tabulation, it will be noted that there is a definite advantage in the new process over the process of 2,077,041 and the prior art, which used concentrated aqueous solutions of silver nitrate, when the olefin is ethylene. It will also be noted, however, that the capacity of silver nitrate is about proportional to the percentage of silver nitrate used; but percentages greater than 75 per cent seem impractical because of crystallization at the lower temperature (below 10° C.) necessary to have the ethylene liquid and the pressure of a reasonable order. The solubility of silver nitrate at 6° C. is only 60 per cent. The process of 2,077,041 and the prior art could not dissolve more than 12 to 13.5% ethylene by weight, while the new process dissolves up to 16.4% ethylene by weight using "75%" silver nitrate at 6° C.

The data for propylene reveal an extension in scope to much lower propylene concentrations than are possible with anhydrous silver nitrate (75 per cent at 0° C. and 85 per cent at 25° C.), combined with high capacity, especially at 0° C. The low temperature presents no problem with crystallization in this instance because the propylene-silver nitrate complex is still liquid at 0° C. The solvent power for propylene even from a feed containing 24% propylene is still high, 20.2% by weight at 0° C. The saturated solution (55% at 0°) dissolves only about 13% by weight under the same conditions.

On desorption the excess silver nitrate crystallizes again, and the portion of propylene held by it is evolved without evacuation. At atmospheric pressure, some propylene remains dissolved in the aqueous solution, but since the proportion of solution is much less than in the prior art, the desorption is more complete. 1-butene shows similar relationships.

The advantage of the new process is especially striking in the case of 2-butene, which is inert to solid silver nitrate, and which has a low solubility in the saturated solution (71 per cent) only 4% 2-butene. Here, 2-butene shows solubilities, e. g. 25.8 per cent, comparable with those of propylene and 1-butene in the new solvent, 26.8% by weight at 0° C. Isobutene shows similar relationships.

The invention is further illustrated by several triangular graphs or ternary diagrams, Figures 1 through 6. Data for these diagrams were obtained at 20–25° C., except for the data obtained with ethylene at 6° C. and shown in Figure 2. In each figure, S is solid silver nitrate, L is one liquid phase, and 2L means two liquid phases.

Figure 3:
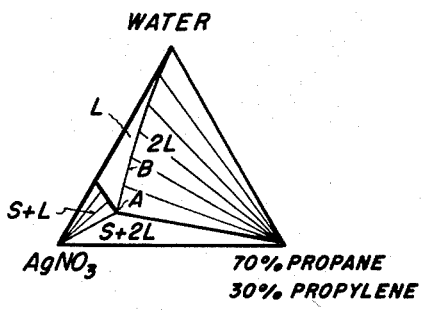

Referring to Figure 1, the propylene solubility curve is shown by Water-D and the solubility of silver nitrate crystals is shown by NC. It will be noted that the anhydrous liquid complex exists in a narrow composition range (CD). When propylene is diluted with propane (Figure 3), the propylene solubility curve, Water-D of Figure 1, moves over and intersects the silver nitrate solubility curve, but still shows a higher solubility, A, than at slightly lower concentrations of silver nitrate, B. The line Water-A of Figure 3 shows distinct curvature, so that the solubility of propylene, indicated by the thickness of area L, increases more than proportionately to the silver nitrate concentration (distance from Water toward AgNO$_3$). This capacity for olefins continues to increase even beyond the normal solubility of silver nitrate, since the latter is increased by the presence of propylene, even in dilute form.

If over 85% propylene were being supplied, this increased capacity for propylene could be extended all the way to anhydrous silver nitrate, as in Patent 2,498,204 (see Figure 1). But with dilute propylene that reagent, anhydrous silver nitrate, gives no reaction. The relative proportions of silver nitrate and water are preferably adjusted to the same relative amounts as at point A (Figure 3), whose position depends upon the percentage of propylene in the feed. Point A is at C in Figure 1 with 85% or more propylene and at N with 0% propylene.

Figure 2:
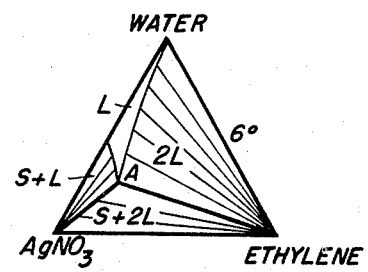
Figure 4:
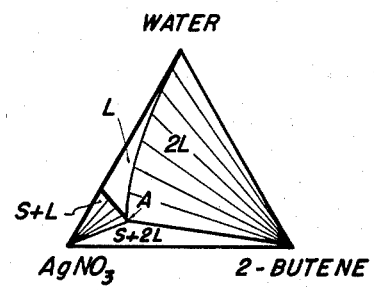

Figure 2 for pure ethylene and Figure 4 for pure 2-butene show similar relationships, the effect being less pronounced (the curve, Water-A, more nearly straight) for ethylene and more so (the curve, Water-A, more highly curved) for 2-butene.

Figure 5:
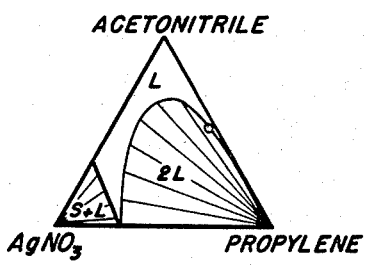
Figure 6:
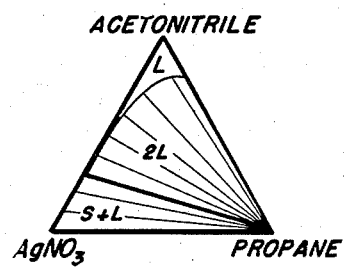

It has also been found that acetonitrile is advantageous in the foregoing process. The relations of acetonitrile are illustrated herein by Figures 5 and 6. The lower left half (the area bounded by AgNO₃-propylene and the mid-point on the line showing AgNO₃-acetonitrile) of Figure 5 for propylene and acetonitrile, is similar to that of Figure 1, which indicates the resemblance of acetonitrile to water in the present process. The upper right half of Figure 5 showing dilute silver nitrate is very different from Figure 1 because of the miscibility of acetonitrile with propylene. Figure 6 for propane and acetonitrile is included for comparison with Figure 5. Propane has no affinity for silver nitrate and is only moderately soluble in acetonitrile. Acetonitrile alone has only a slight selectivity for a propane-propylene mixture. Other solvents which can be used in place of water or acetonitrile, include: propionitrile, benzonitrile, pyridine, phenol, aniline, ethylene glycol and glycerol.

It will be seen from the foregoing tabulation and figures that the amount of solvent, such as water, used with silver nitrate will vary with the specific olefin or olefins to be separated and will also vary with the concentration of such olefin or olefins in the charge. In all cases, however, the amount of solvent is less than that which is necessary to dissolve all of the silver nitrate used. In general, it is recommended that for efficient operation the amount of solvent used should be from about 15 to about 85 per cent of that necessary to dissolve all of the silver nitrate at the operating conditions of temperature and pressure. Stated in another manner, the amount of silver nitrate used will be about 75 to about 95 per cent by weight, of the total quantity of silver nitrate and solvent. The preferred solvent herein is acetonitrile.

The olefins which may be separated by the new process from mixtures containing the same, are olefins and particularly the mono-olefins containing from two to six carbon atoms per molecule. Typical of such olefins are: ethylene, propylene, 1-butene, 2-butene, isobutene, pentenes, isopentenes, hexenes.

As indicated above with the tabulated data, the process can be used to separate olefins from mixtures of relatively low olefin concentration. For example, the olefin can be present in an amount of about 25 per cent in the case of propylene. Although the olefin concentration can be as low as about 15 per cent, by weight, the concentration should be in excess of about 25 per cent for more efficient operation.

Materials which may be present in the mixtures containing the aforesaid olefins, can be hydrocarbons such as ethane, propane, butanes, etc., or any gas such as air or carbon dioxide, or liquid inert to silver nitrate. This excludes hydrogen sulfide, mercaptans, hydrogen halides and ammonia. Preferably, acetylene and/or butadiene should be absent, or present in extremely small amounts because of their tendency to form explosive complexes with silver nitrate.

Operating temperatures, of necessity, will depend upon the mixture treated or the olefin to be separated therefrom. With ethylene for example, recommended temperatures are 0 to 10° C.; with propylene, 0 to 25° C.; etc. Pressures used also will vary. Recommended are those within the range of 20 to 50 atmospheres for ethylene. For higher olefins the pressure is preferably enough to maintain the olefin in liquid form, namely five to ten atmospheres for propylene and 1.5 to 3 atmospheres for butenes.

With regard to desorption of the liquid complexes, it is advantageous to separate the olefin from its association with silver nitrate by heating the complex or reducing the pressure thereupon. As described in 2,498,204 temperatures above about 36° C., at atmospheric pressure, can be used to dissociate the propylene-silver nitrate complex. Similarly, temperatures above about 25° C. can be used to dissociate the 1-butene-silver nitrate complex. In general, temperatures from 30 to 40° C. can be advantageously used to dissociate the liquid complexes. Alternatively, a reduction of pressure to or below atmospheric suffices to accomplish more or less complete removal of olefin from solution.

I claim:

1. A process for separating an olefin, from a fluid mixture containing at least about 15 weight per cent of said olefin, which comprises: contacting said mixture with a treating agent consisting essentially of silver nitrate and a non-reactive solvent for silver nitrate, the solvent being present in an amount from about 15 to about 85 per cent of that necessary to dissolve all of the silver nitrate, to form a liquid complex of said olefin and silver nitrate, said contacting being effected under conditions of temperature and pressure at which said liquid complex is stable; separating said complex from the remainder of the mixture while maintaining said temperature and pressure conditions; and dissociating said complex to silver nitrate and said olefin, thereby separating said olefin.

2. In the process for separating a mono-olefin from a fluid mixture containing said mono-olefin, with silver nitrate, the improvement which comprises: contacting said mixture with a treating agent consisting essentially of silver nitrate and a non-reactive solvent for silver nitrate, the said non-reactive solvent being present in an amount from about 15 to about 85 per cent of that necessary to dissolve all of the silver nitrate.

3. The process of claim 1 wherein the solvent is one selected from the group consisting of water, acetonitrile, propionitrile, benzonitrile, pyridine, phenol, aniline, ethylene glycol and glycerol.

4. The process of claim 1 wherein the olefin is ethylene.

5. The process of claim 1 wherein the olefin is propylene.

6. The process of claim 1 wherein the olefin is 2-butene.

7. In the process for separating a mono-olefin from a fluid mixture containing said mono-olefin, with silver nitrate, the improvement which comprises: contacting said mixture with a treating agent consisting essentially of silver nitrate and acetonitrile, the acetonitrile being present in an amount from about 15 to about 85 per cent of that necessary to dissolve all of the silver nitrate.

8. A process for separating a mono-olefin having from two or about six carbon atoms per molecule, from a fluid mixture containing at least about 15 weight per cent of said olefin, which comprises: contacting said mixture with a treating agent consisting essentially of silver nitrate and acetonitrile, the acetonitrile being present in an amount from about 15 to about 85 per cent of that necessary to dissolve all of the silver nitrate, to form a liquid complex of said olefin and silver nitrate, said contacting being effected under conditions of temperature and pressure at which said liquid complex is stable; separating said complex from the remainder of the mixture while maintaining said temperature and pressure conditions; and dissociating said complex to silver nitrate and said olefin, thereby separating said olefin.

9. A process for separating a mono-olefin having from two or about six carbon atoms per molecule, from a mixture of hydrocarbons containing at least about 15 weight per cent of said olefin, which comprises: contacting said mixture with a treating agent consisting essentially of silver nitrate and acetonitrile, the acetonitrile being present in an amount from about 15 to about 85 per cent of that necessary to dissolve all of the silver nitrate, to form a liquid complex of said olefin and silver nitrate, said contacting being effected under conditions of temperature and pressure at which said liquid complex is stable; separating said complex from the remainder of the hydrocarbon mixture while maintaining said temperature and pressure conditions; and dissociating said complex to silver nitrate and said olefin, thereby separating said olefin.

10. A process for separating a mono-olefin having from two to about six carbon atoms per molecule, from a fluid mixture containing at least about 15 weight per cent of said olefin, which comprises: contacting said mixture with a treating agent consisting essentially of silver nitrate and water, the water being present in an amount from about 15 to about 85 per cent of that necessary to dissolve all of the silver nitrate, to form a liquid complex of said olefin and silver nitrate, said contacting being effected under conditions of temperature and pressure at which said liquid complex is stable; separating said complex from the remainder of the mixture while maintaining said temperature and pressure conditions; and dissociating said complex to silver nitrate and said olefin, thereby separating said olefin.

11. A process for separating a mono-olefin having from two to about six carbon atoms per molecule, from a mixture of hydrocarbons containing at least about 15 weight per cent of said olefin, which comprises: contacting said mixture with a treating agent consisting essentially of silver nitrate and water, the water being present in an amount from about 15 to about 85 per cent of that necessary to dissolve all of the silver nitrate, to form a liquid complex of said olefin and silver nitrate, said contacting being effected under conditions of temperature and pressure at which said liquid complex is stable; separating said liquid complex from the remainder of the hydrocarbon mixture while maintaining said temperature and pressure conditions; and dissociating said complex to silver nitrate and said olefin, thereby separating said olefin.

12. In the process for separating a mono-olefin from a fluid mixture containing said mono-olefin, with silver nitrate, the improvement which comprises: contacting said mixture with a treating agent consisting essentially of silver nitrate and water, the water being present in an amount from about 15 to about 85 per cent of that necessary to dissolve all of the silver nitrate.

ALFRED W. FRANCIS.

References Cited in the file of this patent

UNITED STATES PATENTS

| Number | Name | Date |
| --- | --- | --- |
| 2,395,957 | Breuer | Mar. 5, 1946 |
| 2,458,067 | Friedman et al. | Jan. 4, 1949 |